Patented Oct. 24, 1933

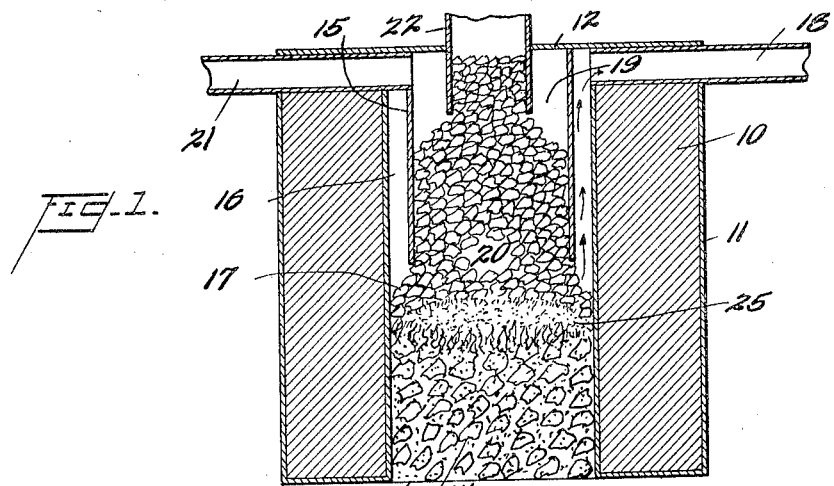
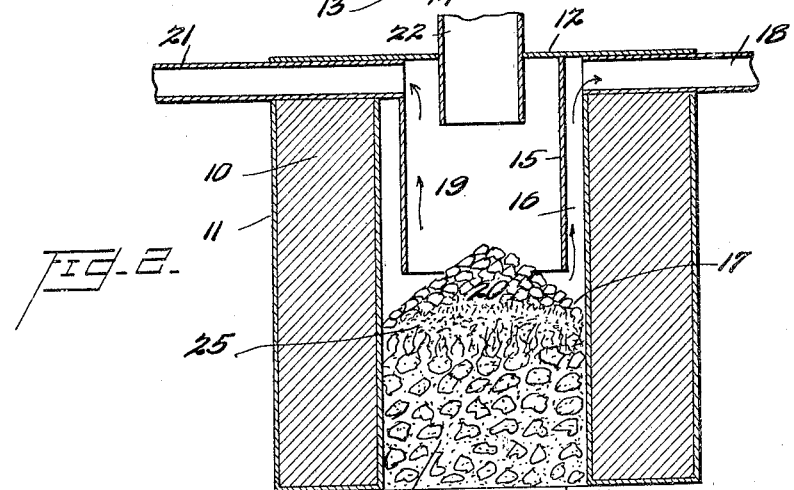
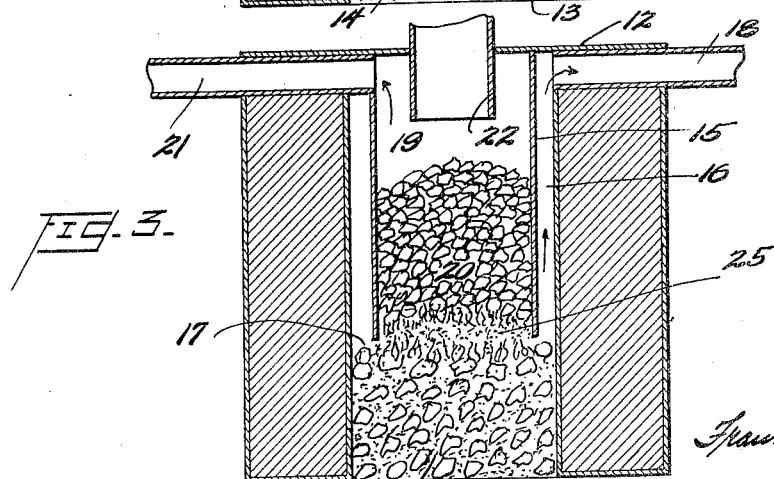

1,931,716

UNITED STATES PATENT OFFICE 1,931,716

METHOD OF GENERATING PRODUCER GAS

Frank N. Becker, Jeddo, Pa., assignor to Jeddo-Highland Coal Company, Jeddo, Pa., a corporation of Pennsylvania Application November 18, 1929
Serial No. 408,136

2 Claims. (Cl. 48—203)

This invention relates to methods of operating gas producers and more specifically to methods of operating so-called "producer gas" generators which are adapted, through the incomplete combustion of carbonaceous fuels and the reduction of the carbon dioxide resulting from the complete combustion or oxidation thereof, to produce a gas consisting mainly of varying quantities of carbon monoxide, carbon dioxide and nitrogen. Since carbon monoxide is the chief combustible constituent of producer gas, it is highly important to obtain from the generator a resulting gaseous mixture containing as large a proportion of this component as possible, with a correspondingly low proportion of incombustible carbon dioxide.

Experience has demonstrated the substantial correctness of the following propositions with regard to the processes of combustion in the ordinary producer gas generator. First, no matter of what material the walls of the fire pot of the generator may be constructed,—whether of fire brick or other refractory material, or of metal, either air or water cooled,—there is always a flow of heat from the highly heated interior of the generator through the walls to the cooler medium on the outside. This flow of heat causes the marginal portion of the fuel bed adjacent the walls of the generator to have a lower temperature than the central portion. Furthermore, the passage of the air through the fuel bed from the bottom thereof is accelerated at the marginal portion of the bed since there are, adjacent to the smooth wall of the fire pot, less tortuous paths for the air streams to follow, than at the central portion, where the irregularly shaped lumps of fuel are permitted to intermesh and pack together.

Tests have shown that, in the reduction of carbon dioxide to carbon monoxide by the passage of the former gas through a bed of highly heated carbon, the higher the temperature of the carbon through which the carbon dioxide passes and the longer the period of contact between the highly heated carbon and the carbon dioxide, the greater will be the amount of carbon monoxide formed. With these principles in mind, it will be apparent that, under the conditions above described with relation to the combustion chamber of the ordinary gas producer, the portion of the fuel bed adjacent the side walls, being at a lower temperature and permitting a larger quantity of air to pass through in a given time, than at the center of the bed, the rate of formation of carbon monoxide in this side wall zone will be lower than the rate of formation of this gas in the more highly heated central zone, wherein at the same time the velocity of the gases is also less.

It is, therefore, one of the objects of this invention to provide a producer gas generator of novel design, having means for separating the gaseous products of combustion of the fuel therein in such manner that the gases having a high carbon monoxide content may be withdrawn separately from the gases of low carbon monoxide content.

It is a further object of the present invention to provide a thermal blanket or envelope of highly heated fuel and gaseous products of combustion around a portion of the combustion chamber of a gas producer for the purpose of preventing or minimizing the heat losses by conduction from this portion through the side walls of the producer.

Another object of the invention is the provision of a producer gas generator in which a portion of the fuel in the fire pot thereof is completely burned to its final products of combustion and in which another portion of the fuel is maintained under such conditions as are most conducive to a maximum production of combustible gas.

Further objects of my invention will be apparent from the following specification when read in connection with the accompanying drawing in which several embodiments of my invention are illustrated by way of example.

Figure 1 is a vertical axial sectional view through one embodiment of a producer gas generator constructed in accordance with the principles of my invention, the parts of the generator being rather diagrammatically illustrated and many customary elements being omitted for the sake of clearness;

Figure 2 is a similar view of a generator illustrating another arrangement included within the scope of this invention; and Figure 3 is a view also in cross-section of a still further modification of the producer gas generator.

In the drawing, the numeral 10 indicates, generally, in each view, the fire pot or combustion or gasifying chamber of the producer gas generator. The fire pot 10 may be of any shape although it is preferably cylindrical and comprises the side wall 11, the top 12 and a grate, having its upper surface located approximately in the plane of the producer wall bottom, as indicated at 13, adapted to support the bed of fuel 14. Air is of course supplied through the grate either by natural draft or under pressure to support combustion of the fuel. Depending from the top or cover 12 is the hollow cylindrical partition 15 which is spaced from the side wall 11 forming an annular chamber 16 above the marginal portion 17 of the fuel bed. This chamber 16 is adapted to receive the gaseous products of the combustion of the fuel of the marginal portion 17 of the fuel bed and these gases are withdrawn through the conduit 18. It is to be understood that the partition 15, although it is shown as being supported by the cover 12 of the generator, may be secured in its position by supports extending from the side wall 11 or by any other preferred means. The central space 19, enclosed by this partition 15, is adapted to receive the gases formed within the central zone 20 of the fuel bed, and these gases are exhausted through the conduit 21.

The partition or separating wall 15 may be made of any material which is sufficiently heat-resistant to meet the conditions imposed upon it but it is preferred to construct this partition of iron since the zone of combustion into which it is to be introduced is mainly of a reducing nature and the metal of the partition will not be rapidly oxidized therein.

The fuel, which is generally coke or anthracite coal, is introduced into the generator through a centrally disposed conduit or chute the lower end of which is shown at 22. This chute extends into the central space 19 of the fire pot and when fuel is not being delivered, it is closed in any suitable manner. It will be noted that the level of the fuel bed at the marginal portion 17 is never higher than the lower end of the partition 15. The partition 15 may extend downwardly so that its lower end is disposed within the incandescent zone 25 of the fuel bed as shown in Fig. 3 or it may be shortened as shown in Figs. 1 and 2 so that it terminates above the incandescent zone. In Figure 1 the fuel bed of the central zone 20 is built up for a considerable distance within the partition 15. In Fig. 2, the level of the fuel bed is maintained at a point below the lower end of the partition 15.

In each case, as explained heretofore, there will be practically complete combustion of the fuel in the marginal zone 17 of the fuel bed due to the comparatively rapid rate of flow of air through this portion and also due to the lower temperature which prevails in this portion on account of the conduction of heat through the wall 11. The fuel in this marginal portion of the bed is allowed to burn completely to its final product of combustion, carbon dioxide, and this bed of incandescent coals adjacent the side walls constitutes a thermal blanket which prevents the marginal portions of the central zone 20 from being subjected to heat losses by conduction through the outer wall 11. Thus it will be seen that the temperature of the fuel in the central zone 20 will be maintained at a higher degree, the rate of flow of air and gaseous products of combustion will be slower, and the path of these gases will be longer and more tortuous. Consequently there will be produced a much larger percentage of carbon monoxide in this central zone than in the marginal zone. These central zone gases are withdrawn from the space 19 through the conduit 21 while the waste gases arising from the marginal zone 17 forming the thermal blanket, are withdrawn through the space 16 and the conduit 18.

There is thus provided by means of this invention, a producer designed to generate a gas which is richer in carbon monoxide than the gases produced in the ordinary generator. Tests have shown that with a carbon dioxide content of 12% to 15% and a carbon monoxide content from none to 7% formed in the side wall zone 17, the carbon monoxide content of the gases from the central zone 20 are as high as 25% or more with a corresponding decrease in the proportion of carbon dioxide.

It is to be noted that the process, which has been described as embodying the present invention, is primarily concerned with the production of a gas rich in combustible constituents, and as has been stated, these constituents comprise chiefly carbon monoxide. This is true, since the solid fuel employed comprises preferably anthracite coal or coke, and the invention as defined in the following claims is not to be confused with processes in which fuels rich in volatile material are distilled for the recovery by condensation or the like of such material.

It is obvious that various changes and alterations can be made in the three embodiments illustrated in the drawing without departing from the scope of the invention as defined in the following claims.

Having thus described the invention, what is claimed as new and desired to be secured by Letters Patent is:

1. The method of producing gas by the combustion of solid fuel of substantially low volatile content which comprises enclosing a body of solid fuel in lump form within a combustion chamber, passing all air required for combustion upwardly through said fuel body, maintaining a portion of said fuel body below the upper surface thereof in a state of combustion, fresh fuel being added from time to time and ashes being withdrawn from the chamber below the combustion zone, and dividing the gases arising from the substantially continuous top surface of the fuel body into a plurality of streams, the gases high in combustible constituents being withdrawn separately from those low in such constituents.

2. The method of producing gas by the combustion of solid fuel of substantially low volatile content which comprises enclosing a body of solid fuel in lump form within a combustion chamber, passing all air required for combustion upwardly through said fuel body, maintaining a portion of said fuel body below the upper surface thereof in a state of combustion, fresh fuel being added from time to time and ashes being removed from the chamber below the combustion zone, separating the gases arising from that portion of the substantially continuous top surface of the fuel bed which lies adjacent the chamber walls from the gases arising from the remaining portion of said surface, and separately removing the separated bodies of gas from the chamber.

FRANK N. BECKER.